United States Patent
de Luca Neto

(10) Patent No.: US 9,445,632 B2
(45) Date of Patent: Sep. 20, 2016

(54) SONIC WELDING OF FABRIC FOR 3-D COSTUME COMPONENTS

(71) Applicant: Persio de Luca Neto, Sao Paulo (BR)

(72) Inventor: Persio de Luca Neto, Sao Paulo (BR)

(*) Notice: Subject to any disclaimer, the term of this patent is extended or adjusted under 35 U.S.C. 154(b) by 167 days.

(21) Appl. No.: 14/255,156

(22) Filed: Apr. 17, 2014

(65) Prior Publication Data

US 2015/0296897 A1 Oct. 22, 2015

(51) Int. Cl.

| | |
|---|---|
| *A41D 1/00* | (2006.01) |
| *B32B 5/24* | (2006.01) |
| *B32B 3/30* | (2006.01) |
| *B32B 7/12* | (2006.01) |
| *B32B 37/12* | (2006.01) |
| *B32B 37/18* | (2006.01) |
| *B32B 38/18* | (2006.01) |
| *B29L 31/48* | (2006.01) |
| *B29C 65/08* | (2006.01) |
| *B29C 65/48* | (2006.01) |
| *B29C 65/00* | (2006.01) |
| *B29C 65/04* | (2006.01) |

(52) U.S. Cl.
CPC . *A41D 1/00* (2013.01); *B32B 3/30* (2013.01); *B32B 5/245* (2013.01); *B32B 7/12* (2013.01); *B32B 37/1292* (2013.01); *B29C 65/04* (2013.01); *B29C 65/08* (2013.01); *B29C 65/48* (2013.01); *B29C 66/1122* (2013.01); *B29C 66/436* (2013.01); *B29C 66/71* (2013.01); *B29C 66/727* (2013.01); *B29C 66/729* (2013.01); *B29C 66/949* (2013.01); *B29L 2031/4842* (2013.01); *B32B 37/18* (2013.01); *B32B 38/1866* (2013.01); *B32B 2250/40* (2013.01); *B32B 2255/02* (2013.01); *B32B 2262/0276* (2013.01); *B32B 2305/022* (2013.01); *B32B 2305/38* (2013.01); *B32B 2307/51* (2013.01); *B32B 2310/028* (2013.01); *B32B 2437/00* (2013.01)

(58) Field of Classification Search
CPC .... A41D 1/00; A41D 27/08; A41D 13/0518; A41D 2300/52; D06M 23/14; B32B 5/18; B32B 2310/028; B32B 5/245; B32B 37/1292; B32B 7/04; B32B 38/1866; B32B 3/00; B32B 3/30; B32B 7/12; B32B 2437/00; B32B 2305/38; B32B 2262/0276; B32B 2255/02; B32B 2305/022; B32B 2347/00; B29C 65/04; B29C 65/08; B29C 65/48; B29C 66/1122; B29C 66/436; B29C 66/727; B29C 66/729; B29C 66/949; D03D 25/005; B29L 2031/4842
USPC ..................... 428/156, 158, 198, 172, 304.4; 442/221, 370
See application file for complete search history.

(56) References Cited

U.S. PATENT DOCUMENTS

| | | | | |
|---|---|---|---|---|
| 4,157,272 A | * | 6/1979 | Kuroda | .................. B29C 65/02 156/219 |
| 6,067,660 A | * | 5/2000 | Contini | .................. A41D 27/08 2/115 |
| 6,139,928 A | * | 10/2000 | Sloot | ........................ B32B 3/28 156/284 |

* cited by examiner

*Primary Examiner* — Catherine A Simone

(74) *Attorney, Agent, or Firm* — Andrew S. Langsam; Pryor Cashman LLP

(57) ABSTRACT

A three dimensional component for a costume, intended to simulate a three-dimensional body part or other object, comprises an inner soft or cushiony layer of foam, an outer fabric layer, a graphic printed upon the outer layer, and a sonic or ultra high frequency welding of the outer layer to the cushiony layer along the lines defined by the graphic. The sonic well will compress the foam to the fabric and the non-compressed foam and fabric sections will visually and physically provide relatively three dimensional areas.

6 Claims, 6 Drawing Sheets

SONIC WELDING OF FABRIC FOR 3-D COSTUME COMPONENTS

BACKGROUND OF THE INVENTION

The present application relates to improvements made in the process for manufacturing costume garments and components thereof with three dimensional shapes such as representative anatomy of muscles of the chest, abdomen, buttocks, muscles in the upper and lower limbs, etc., or non-anatomical forms, such as armor, chest-located logos for superheros, heraldries, head dress and other associated costume and disguise products, etc., where, notably, this new and improved process for manufacturing costume garments and components results in more area and regionally defined, soft, and near perfect finish, reducing irregular surfaces. All the while the three dimensional relief is provided with increased volume of material and facing towards the outside of the garment thereby increasing the look and realism of the form. The present invention provides a simple costume element with areas or features which are bordered, at least in part, by sonic weld lines and, between adjacent of such sonic weld lines, the outside fabric is "puffed" out to provide a three dimensional feature, the three dimensionality being provided by underlying foam material which is sealed to the fabric at the sonic weld lines. Thus, the underlying foam appears puffed outwardly and projects above the surface of the foam while the portions of the device where the fabric is welded to the foam are visually relatively depressed. The sonic weld lines are crisp, clear, and can be used in a variety of manners to define three dimensional areas adjacent to one another, separated by the sonic weld lines.

DESCRIPTION OF THE PRIOR ART

It is known that, currently, there are many types of costume garments developed either for children or for adult wearers and these garments comprise diverse styles through the reproduction or graphical representation of fictional cartoon characters, superheroes of books, comics, movies, stories, legends, etc. In addition, even ordinary people are often depicted with three dimensionally enhanced musculature, e.g., a policeperson, firefighters, airline pilots, infantryman, football player, among others and even inanimate objects can be characterized, enhanced, and made more or desirably less realistic and/or visually interesting through the use of three dimensional costume components integrated into and with the other fabric of the costumes for wear by the children and/or adults.

In general, the costume garments track or follow the shape according to the character/object to be reproduced or simulated. So, for individuals whose shape presents anatomy (like a weight lifter, wrestler, superhero, etc.) with bulky and well-defined muscles, these new costumes or garments trying to simulate the same will need to simulate exaggerated anatomical forms, especially when worn by ordinary, i.e., not well-built or toned, children or adults. In such cases some three dimensional details of the muscles and/or objects are still difficult and expensive to accurately and quickly manufacture and reproduce, and, while not impracticable by currently used thermal or vacuum forming of fabric to underlying foam, they and other techniques have limits-especially crispness of the boundaries between adjacent puffed out areas and the ease of making the same.

A current manner of manufacturing costume garments with three dimensional shapes for the surfaces of anatomical shapes is found in thermal or vacuum molding at elevated temperature, usually by laminating a fabric piece to a foam layer of a rigid or semi-rigid polymer which is then vacuum or thermally formed into the three dimensional component. This produces areas of three dimension, or puffed out or projected areas with respect to adjacent flat areas. One such manner of doing so is described and taught by U.S. Pat. No. 5,747,144 issued May 5, 1998 which was Reissued as RE 37533 on Jan. 29, 2002. The teaching and description of that invention is specifically and expressly incorporated herein. If a front chest piece, for example, is created it can be sewn to the rest of the costume comprising a spandex type cotton or polyester fabric, which together with the formed costume component, forms a complete costume.

Among some inconveniences relating to this method of manufacture, one relates to the fact that it presents a too rigid front portion, which complicates the ease and free movement of the user, particularly for children. Also, the weight of this integrated or fused fabric to foam, then vacuum formed, component can be too much for small or young children.

Another method of making costume garments and components that seek to mimic or exaggerate the anatomical form is presented as a T-shirt or jumpsuit, made by quilting by sewing fabric foam or similar material, where the fabric is a polyester type or synthetic leather, which is then applied with graphic prints representing the anatomical shapes of the muscles of the human body, which are generally bounded by print lines defining the conformation of a muscle and others. Accordingly, to promote the conformation of the "muscles" in the padded fabric, a line of stitches may be used to delimit a muscle from another. This is fine for its intended purpose but does not present as realistic a component as desired. There is a desire for a costume component which is lightweight, simple and easy to manufacture, provides well defined three-dimensional areas of relatively puffed out sections, and is bounded by well-defined lines, with smooth but flat, relative to the puffed out area bounded thereby, contours.

The main inconvenience of one of the prior art embodiments of costume garment manufacturing lies in the fact that during the implementation of the line of stitching or sewing on the graphic prints, they can "go off" of the actual boundary of the hills and valleys (puffed area and flat border) of the stuffed and three dimensional components such that they suffer misalignments that, in addition, result in making the costume look clumsy, cheaply made, and disheveled. This is clearly undesirable.

Another embodiment seeking to provide a three dimensional costume component uses the line of stitches or sewing defining the outer boundary of the puffed out or three dimensional sections, and this results in upwardly and downwardly or inwardly extending threads or "nubs" for both sides of the garment, so, in addition can be uncomfortable for the wearer/user, since the sewing stitches or upwardly and inwardly extending nubs are not flat and can be rough and abrade when adjacent the skin of the wearer. These are not suitable on or near the skin, and the volume "muscle" turns out to be reduced in the external visual dimension, often requiring a greater thickness of foam to provide a more satisfactory result. This is wasteful and expensive.

Similarly, most costume garments or accessories that are intended to represent products such as bags, containers, etc., are configured by modeling the same in three dimensions as an expanded structural foam frame made of wire or rigid polymer or by coating the structural framework by fabric or foam, where modeling the structural frame comprises a bulky shape.

Despite the characterization of said inanimate characters, these structural frames feature a discomfort to the wearer/user, as well as present a difficult storage and transportation problem for the costume component.

It is a desired object in the art of manufacturing and providing costumes and costume components to provide a three dimensional (peaks and valleys or, stated differently, areas of puffiness adjacent areas or lines of flatness) look. To do so inexpensively, with fine, smooth lines, which precisely track the areas and borders sought to be defined, without the discomfort of sewn stitches adjacent the wearer's skin, is highly advantageous and desirable. To produce the same, economically and realistically, would be a great commercial advantage to a manufacturer.

ADDITIONAL DESCRIPTION OF THE PRIOR ART

A cursory search for Brazilian and international patents, was conducted. This produced some costume garments with three dimensional anatomical shapes, such as that shown in U.S. Pat. No. 5,747,144. It teaches a process, component and end product for manufacturing a costume with semi-rigid costume components, and the costume itself. The semi-rigid or foam costume components are capable of being attached to other sections of the fabric. The foam is initially integrated with sections of fabric by heat fusion, followed by the step of vacuum forming or thermal forming to form an integrated three dimensional costume component. An embodiment of the invention disclosed therein illustrates the outfit with superhero muscles and a well-toned set of abdominal muscles, a "six-pack." It can be there seen that there are areas of three dimensional or outwardly puffed areas, bounded by flat lines or areas of visually flat lines. The foam or rigid or semi-rigid component is first formed by the fusion of one fabric layer to a foam layer and the resultant two-ply laminate is molded under vacuum or thermal forming, obtaining a three dimensional shape. This, then, is integrated, preferably, into a costume with other pieces of fabric.

The present invention is similar in that it presents, too, a costume component of apparent three dimensional shape with adjacent areas of peaks and valleys, but, now, defined by sonic weld lines. It provides the same, however, by use of sonic welding of fabric to underlying foam. Thus, the present invention eliminates the step of fusing the fabric to the underlying foam and also results in far crisper sonic weld lines to define the areas of puffed out configuration adjacent to the valleys (of sonic weld lines). This sonic welding process results, too, in areas of three dimension and flat boundary lines. The lines are precise, smooth, simple to make and economical to manufacture. The present invention provides the end product without the first step of fusing foam to fabric and without the second step of thermal forming or vacuum molding, but rather entails the simple layering of foam and fabric and joining the same together by sonic weld lines which thereby result in areas of three dimension between and defined by the sonic weld lines. The resultant component is very light weight, provides a very clean, crisp look and is simple to integrate with other pieces of fabric into a costume, inexpensively yet effectively.

Another document—MU 8003006-8—presents a device for enhancement of the female anatomical form comprising a fabric bag adapted to be part of the garment where it is sewn on it, this bag containing a soft filling that enhances the female anatomical form.

Another uncovered piece of prior art is PI 0007371-7. It presents a device for male anatomical shapes composed of a tailored cloth adapted to the garment and sewn on it, this bag containing a soft filling that enhances male anatomical forms.

SUMMARY OF THE INVENTION

Thus, the inventor, was drawn to consider a desire to provide the consumer market with developed improvements introduced in the process of manufacturing costume garments with three dimensional forms integrated therewith, such as anatomical shapes representing the chest and abdominal muscles, abdomen, buttocks, upper and lower limbs, etc., or non-anatomical forms (fictional laser rays strapped to wrists, bows and arrows across the back, insignia of superheros, etc.). The present invention relates to manufacturing and providing a wearable article of clothing, a garment or costume, disguise, or other wearable product with a three dimensional component.

The present invention comprises a set of sequential steps beginning with the shaping of one or more of the three dimensional components or costume parts that will then be integrated, likely by sewing or other integration techniques, with other three dimensional or flat costume components (e.g., sleeves, legs, a back piece, etc. if the chestpiece is three dimensional) to comprise a complete costume garment having at least one three dimensional component.

The individual three dimensional costume components or parts can comprise a central filler material (soft foam is preferred) and one or two, i.e., external coatings (fabric layers) surrounding or at least overlying the central filler or foam material with the two (in its simplest form) layers—foam and fabric, then be sonically welded at boundary lines to present puffed out or three dimensional areas between adjacent lines of sonic welding. In one embodiment the foam filler is sonically welded to the outside fabric layer and in a more expensive embodiment, the foam filler is sandwiched between an inside layer of fabric and an outside layer of fabric, so that the foam filler is not in direct contact with the wearer's skin, but, rather, the fabric on the inside is in such contact. This is believed to be slightly heavier but the comfort level is considered "worth" the added weight.

The central filling may be made of an acrylic blanket, a foam or foam-like composition or other suitable material with a variety of thicknesses, weight, strength and density depending on the type of interior volume desired to be obtained and the "puffiness" or outward extension of the three dimensional component, while the external layers or coatings may be made and provided of a polyester or fabric-like layer, a pad or other synthetic fabric with properties including elasticity or resilience, color fastness, strength, comfort, lightweight, etc. According to the present invention, the welding of the inside foam to the outside fabric, i.e., by welding the contact surfaces between the center filling material and the external layer(s), fabric or coatings may be secured to one another by first using an adhesive film laid down at the point of junction and then activated by a simple sonic activating weld for securing the junction between the layers of foam and fabric. The inside of the fabric layer will fuse to the outside of the foam, a consequence of the adhesive layer between the two becoming activated by the sonic weld.

On top of the outer surface of the external coating(s) or fabric, graphical printing or impressions can be provided, resulting, preferably, with visual markings corresponding to boundary lines for the three dimensional components to be formed into the component. These boundary lines are desirable, useful and configured to be arcs or straight lines, and serve to visually define the boundary edges for the three dimensional or outwardly puffy surfaces which the internal foam volume and the superimposed top fabric layer provide, when the lines are tightly seamed together such that the line of the fabric on top is sonically welded to and secured to the line of the inside central foam filling located beneath it. Where the foam is sonically fused to the fabric, a boundary line which is flat is formed; in between adjacent boundary lines, however, the three dimensional or puffed out areas are visually apparent, by comparison as it is there that the foam or puffy material is not constrained by the weld but, rather, it is puffed outwardly. Stated differently, the boundary lines of sonic welding of fabric to foam pulls those components taut and together while in between the weld lines, the foam is allowed to maintain its expanded condition and thus forms and visually presents puffed out areas of three dimension. This, then, provides the simulation of, for example, the three dimensional muscles or other objects.

Graphic prints can be applied by heat transfer or screen printing onto the outer side of the layer of fabric. An expandable ink can be used so that when the fabric is caused to outwardly bulge or buckle or project to define an outwardly curved feature, like the toned muscles of a "he-man" the printed image will expand, too, and present a unified, visual image without the printing becoming cracked due to the curvature. And, the graphic image printed thereon can help to visually define the three-dimensional configurations, which three dimensional components are developed by sonic welding or seaming together lines of the outer fabric layer to the inner cushioning foam material and/or by having a joint between inner soft, cushiony material and outer fabric at the graphic lines printed on the outer layer such that they help to define the shape-embossed sectors. Stated differently, the graphic lines printed thereon can be precisely superimposed on (or be the guide lines for) the sonic weld lines to maximum visual impact and ease and simplicity of manufacture.

The multiple layers, namely, the internal cushiony or filling core of foam and the external fabric or coatings can be overlaid or integrated to form a single component or layer which is subjected to the sonic fusing process for securing the fabric to the internal foam layer, preferably along the graphic lines, to hold the fabric to the foam filling at the lines and to allow the three-dimensional puffiness of the foam in between the adjacent graphic and sonic welded lines. The graphic lines can be used as visual guides for the fusing process. At the point of fusing, the fabric outer layer is in contact with, superimposed over, and defines a small thickness with the inner cushiony foam. At the other points, however, the fabric is on top of the cushiony foam, not defining a small thickness but, rather, there is a distance between the inside surface of the outer fabric and the far side (or inside) of the cushiony foam. This thickness or distance is what provides the puffiness, contours and the three dimensional look and feel to the costume component.

Furthermore, according to the present invention, the fusing process along the graphic lines, for securing the outer fabric to the inner cushiony foam material, to thereby form the outwardly convex and three dimensional curvature in between adjacent sonic weld lines, is done by high-frequency or ultrasound, preferably lasting about 25 seconds and at a frequency controlled and dependent upon the thickness, material, and density of the inner foam or acrylic cushiony blanket and the outer layer of fabric-like or acrylic material. Preferably, a specific tool (like the foot of a sewing machine) can be adapted for providing the sonic weld which will easily be glided upon the graphic lines on the outer surface of the fabric and thereby provide the high-frequency or sonic welding of fabric to underlying foam, by activating, if used, the adhesive laid down over the underlying foam. Alternatively, the underlying foam can be automatically welded to the fabric by a component within the foam which is activated when the sonic welding device glides over it. This tool or device is similar to a gliding "foot" for a sewing machine, where it rides on the top surface of the uppermost fabric being sewn to the underlying surface. This "foot" holds down the two components, foam and fabric, for ordinary stitching, but the same concept can be used for providing a sonic welding or high-frequency securing between the two layers, with the cushiony material beneath the fabric or, alternatively, with the foam and cushiony material held, by sonic welding, between two layers of sandwiching fabric. In the high frequency welding process, well-known sonic welding coils are used with the mechanism for welding the pieces together, along their graphic lines, and thereby dispersing high-frequency electrical current, that in turn generates an induced current in the joint parts or layers to be welded. The current's heat the joint by the Joule effect, making manufacturing easier. The localized deformation of the outer fabric layer to the other outer fabric layer (where two such fabric layers are used with foam therebetween) results, a consequence of ultra sonic welding under the application of pressure, in a unified piece of a three-dimensional costume component for integration into a costume, with three dimensional visual look and feel.

When the ultrasound welding is provided, a power source can be used that converts the frequency of the received energy of a typical 60 Hz converter to a 20 kHz converter. The device is responsible for converting electrical energy into mechanical energy and such is then applied to the component to be welded through the sonotrode, which is designed to facilitate the parts (foam to fabric) to be welded together.

After welding of the layers or pieces, the unique three dimensional piece, (if a torso component it is like a plate or plate-like device) with one or two layers of outside fabric welded together at the graphic lines and a cushiony layer of material or foam therebetween) is sent to the finishing step. There the component or plate is integrated into the complete article of clothing and/or a costume garment is made, through conventional sewing with the other components, e.g., a lower torso, sleeves, legs, back, collar, etc. The three dimensional costume component is used as an ornament or as an accessory of the overall costume garment and/or as a costume garment by itself and/or as a toy accessory or complementary kit.

So, the final article of apparel or, at least the final three dimensional piece of the costume, has a smooth, substantially perfect finish, with well-defined lines, visually and physically, between the puffed out areas of three dimension, mainly for corresponding to the exact conformation of the visual graphics and guiding lines, serving to guide the sonic welding. The present invention also ensures increased production by reducing time spent on each piece.

Another advantage lies in the fact that the inner surface roughness of the costume garment is quite smooth (when two fabric layers form a sandwich with the foam therebetween) and comfortable for the wearer as there are no physical stitches or nubs of thread extending therethrough and thus not in direct surface contact with the wearer.

BRIEF DESCRIPTION OF THE DRAWINGS

To complement the present description to gain a better understanding of the features of the present invention and according to a preferred practical embodiment thereof, the following is a description, which should be read and understood along with the drawings, where, in an exemplified way, although not exhaustive, the present invention is taught.

DETAILED DESCRIPTION OF THE DRAWINGS AND THE PRESENT INVENTION

Figure 1:
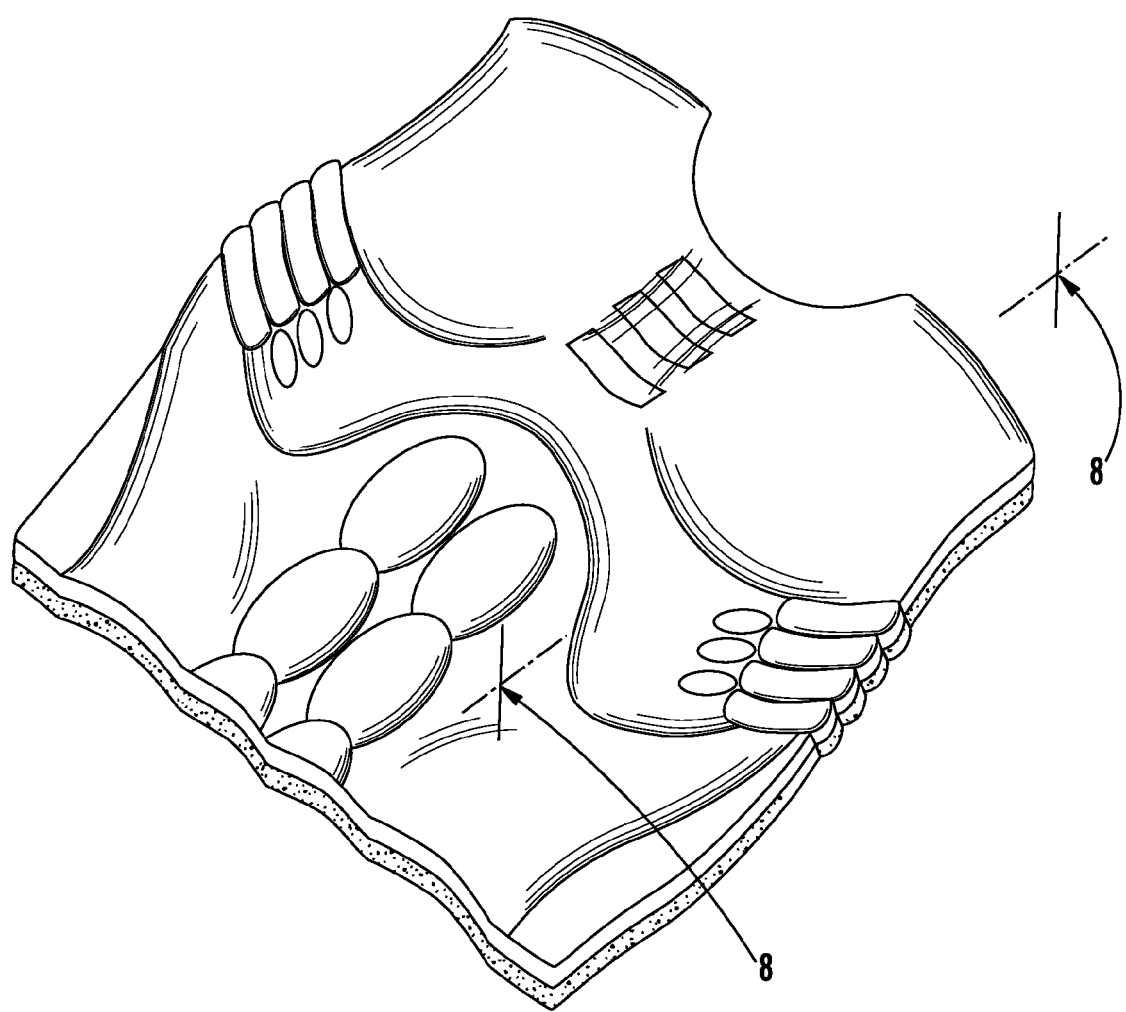
FIG. 1 is an enlarged sectional view of an upper torso component for an article of wearing apparel, a costume or fancy dress as set forth by the prior art.
Figures 2A, 2B:
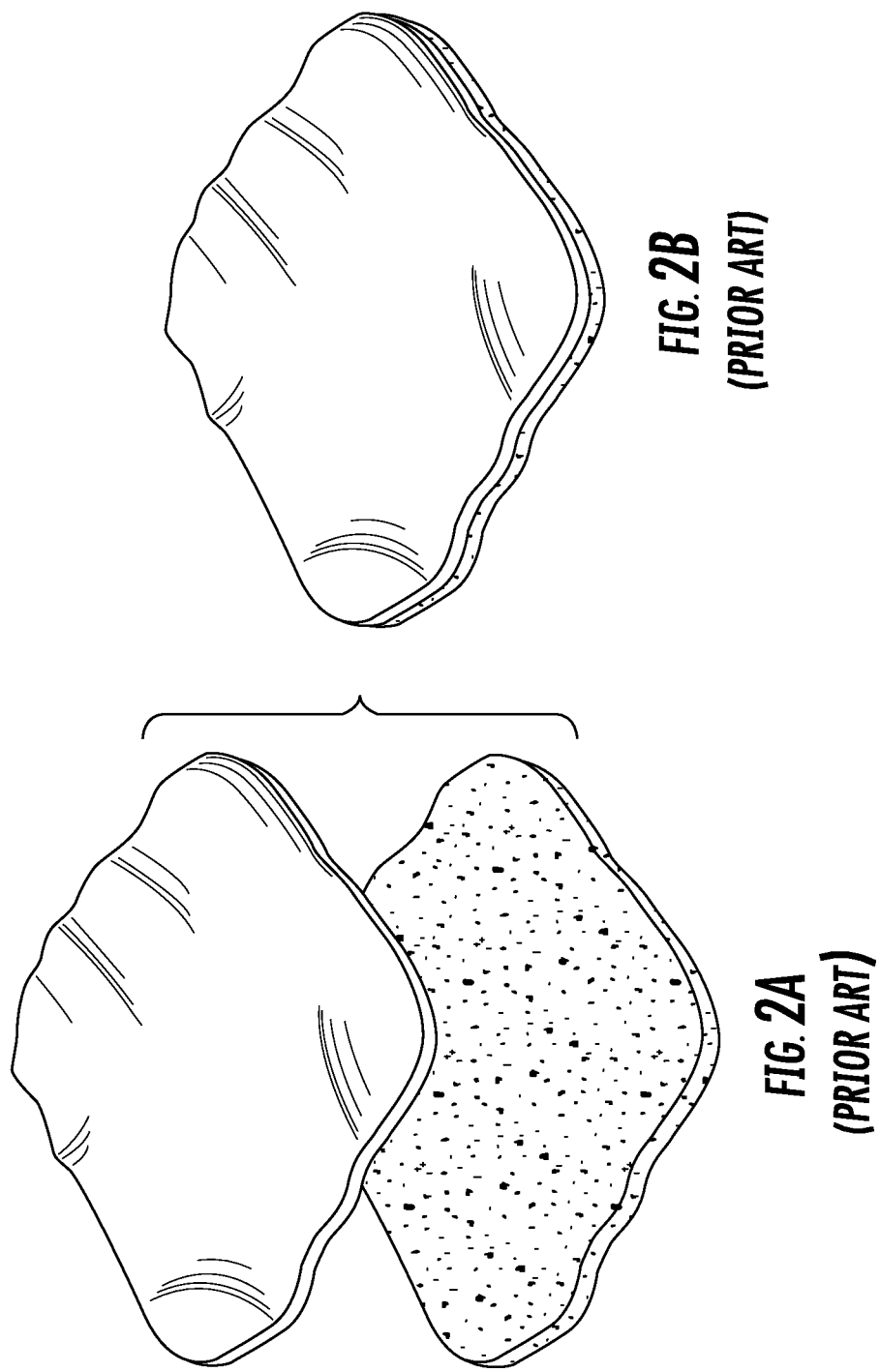
FIG. 2A shows a partial, exploded and perspective view of the component for an article of clothing comprising foam and fabric before fusing the two together and before the thermal or vacuum forming, according to the prior art.
FIG. 2B is another partial and perspective view of the article of clothing consistent with the prior art and shows the fusing of the fabric to the foam before vacuum forming of the same.

With reference to the drawings, the present invention relates to a process for manufacturing and the end product comprising at least one three dimensional costume garment that simulates enhanced anatomical forms, such as well-toned muscles of the chest, abdomen, buttocks, upper and lower limbs, etc., or even other and non-anatomical shapes, such as armor, logos, coats, and other goods.

According to the invention, the process preferably comprises a sequential set of steps to manufacture the costume garment. Preferably, the completed costume component 10, made with at least one component having a three dimensional shape, is configured by at least two layers of laminar material or layers which are superimposed and juxtaposed to each other. The layers comprise a central filling or cushiony or soft foam or fabric 12 or a composite of material which is sonic welded below a layer of fabric 14. Alternatively, the foam 12 is sandwiched between a set of outside and inside, respectively, of fabric layers 14 and 16, whose planar surface on the outside of the fabric layer 14 may be provided with external graphical images printed thereon. On the inside, the foam can be first provided with a layer of fabric or thin gauze to preserve the foam and prevent the same from degradation and abrasion on the skin of the wearer. The central filling 12 is preferably made of an acrylic blanket material, or from foam or other suitable material. The material selected depends, of course, on the end result desired. The central filling 12 can be selected from those having a variety of thicknesses (x) and densities (d) depending on the stiffness, weight, cushion-providing properties, the type of interior three-dimensional volume to be ultimately obtained, while the external layer of fabric or outer coatings 14 and 16 (outside and inside layers of fabric) are preferably made of polyester or other synthetic fabric with somewhat elastic or resilient properties. Preferably, the outside fabric layer 14 is soft polyester fabric which is capable of receipt of graphical inks for printing images or a fabric design thereon.

On the inside of the composite sandwich (the side coming into contact with the wearer) a thin gauze layer 17 can be provided, or another layer of polyester or other fabric 16. Alternatively, the foam on the inside can be bare and be in direct contact with the wearer although it is clearly preferred that a sandwich with the foam in the middle and the polyester fabric layers 14 and 16 on the outside and the thin gauze material on the inside be provided. On the outside fabric 14, a graphical set of inked lines 18 can be provided to enhance the design, the attractiveness of the outer fabric 14, and to facilitate the movement of the piece with respect to the sonic welding tool, or vice versa, with the sonic welding securing the outer fabric 14 to the inner foam 12 along the lines 18 printed thereon.

Figure 3:
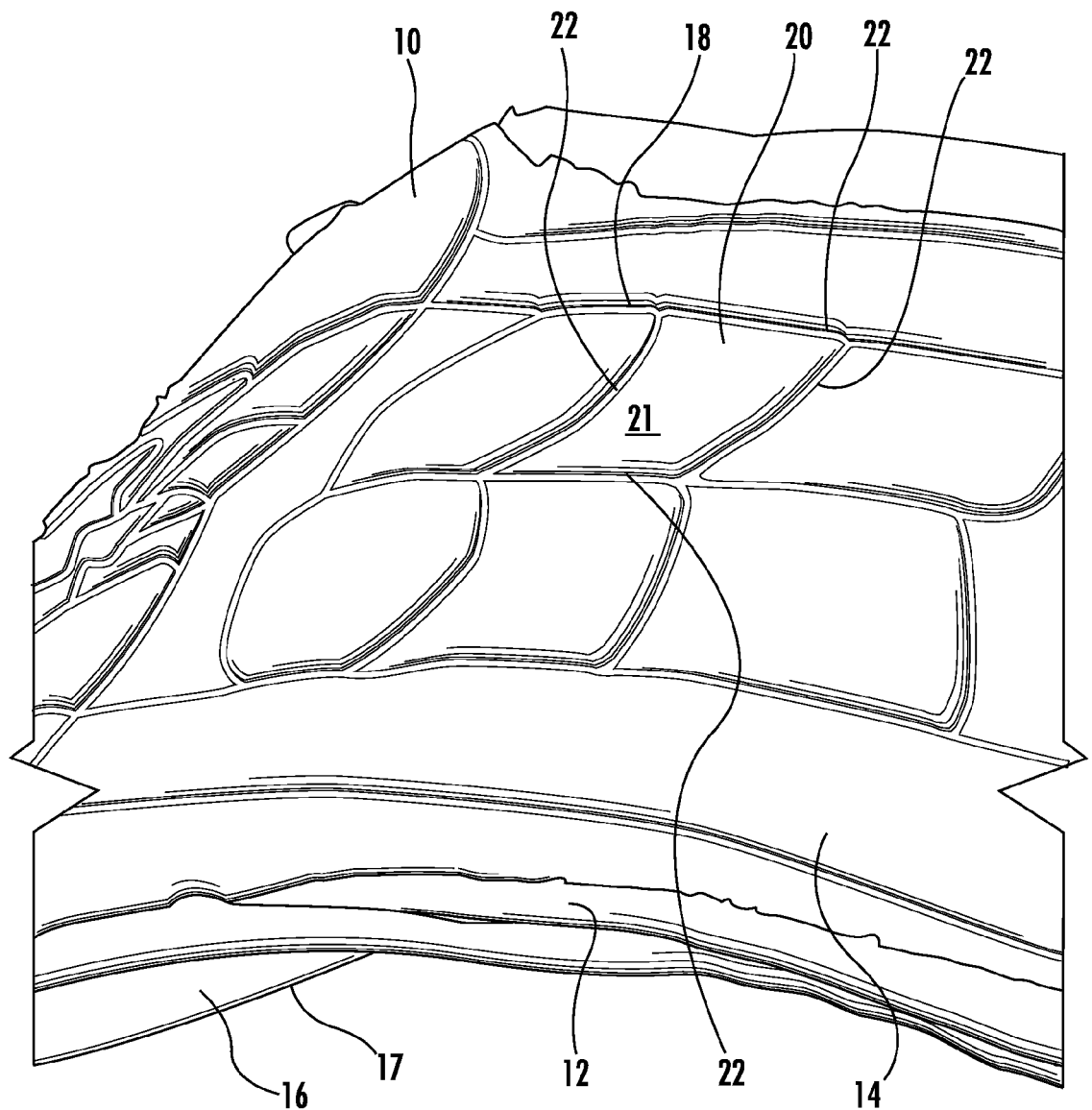
FIG. 3 illustrates an example of a section of a child and adult costume garment component (an upper torso) made consistently with the present invention and is a side view showing the top fabric layer, the underlying foam layer and areas of puffiness separated by sonic weld lines to provide a three dimensional costume component. This component will be integrated with other costume components to form an integrated costume.
Figure 4:
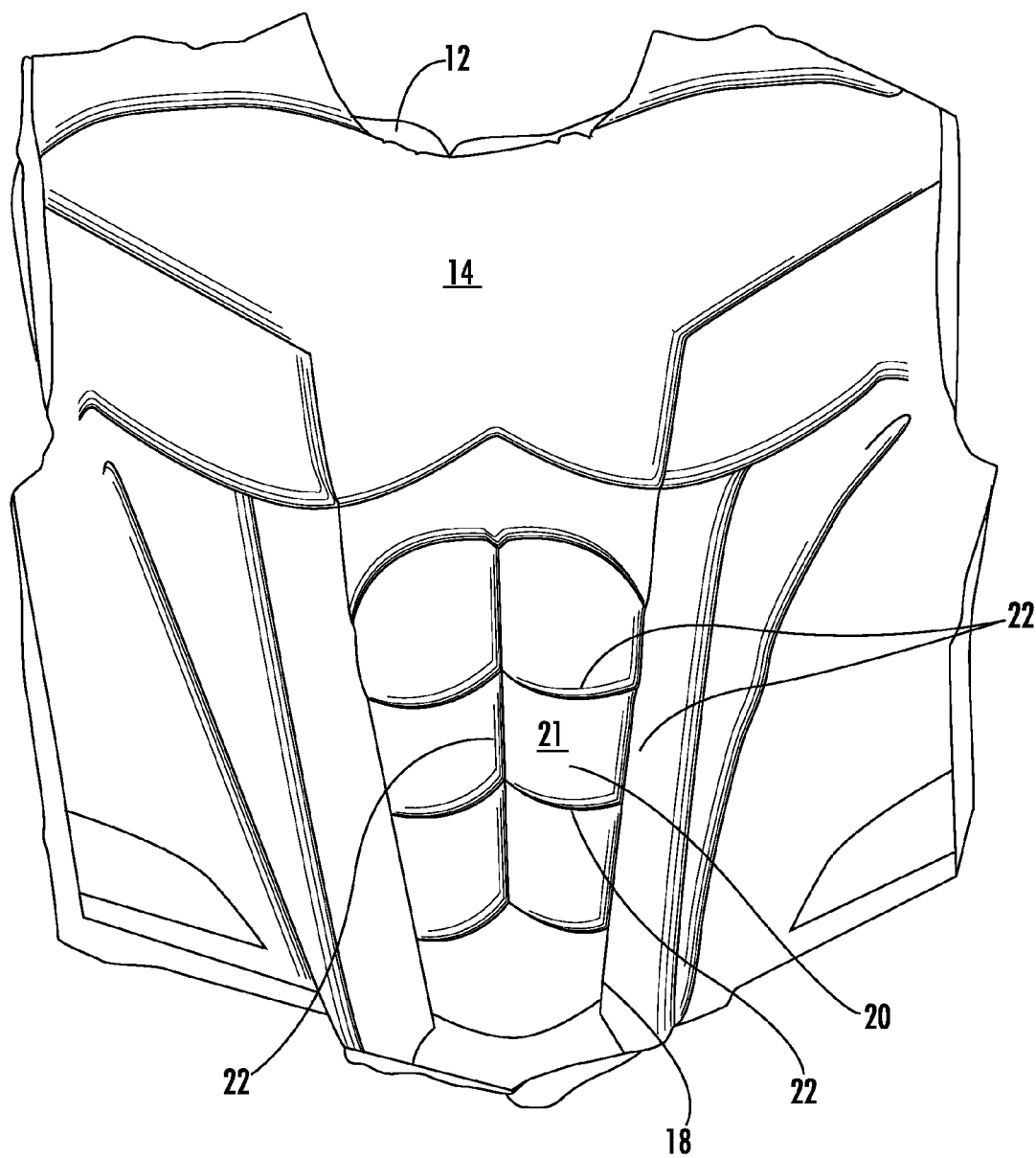
FIG. 4 shows a front view of the finished (but not integrated with other costume elements) three dimensional costume component made according to the present invention.
Figure 5:
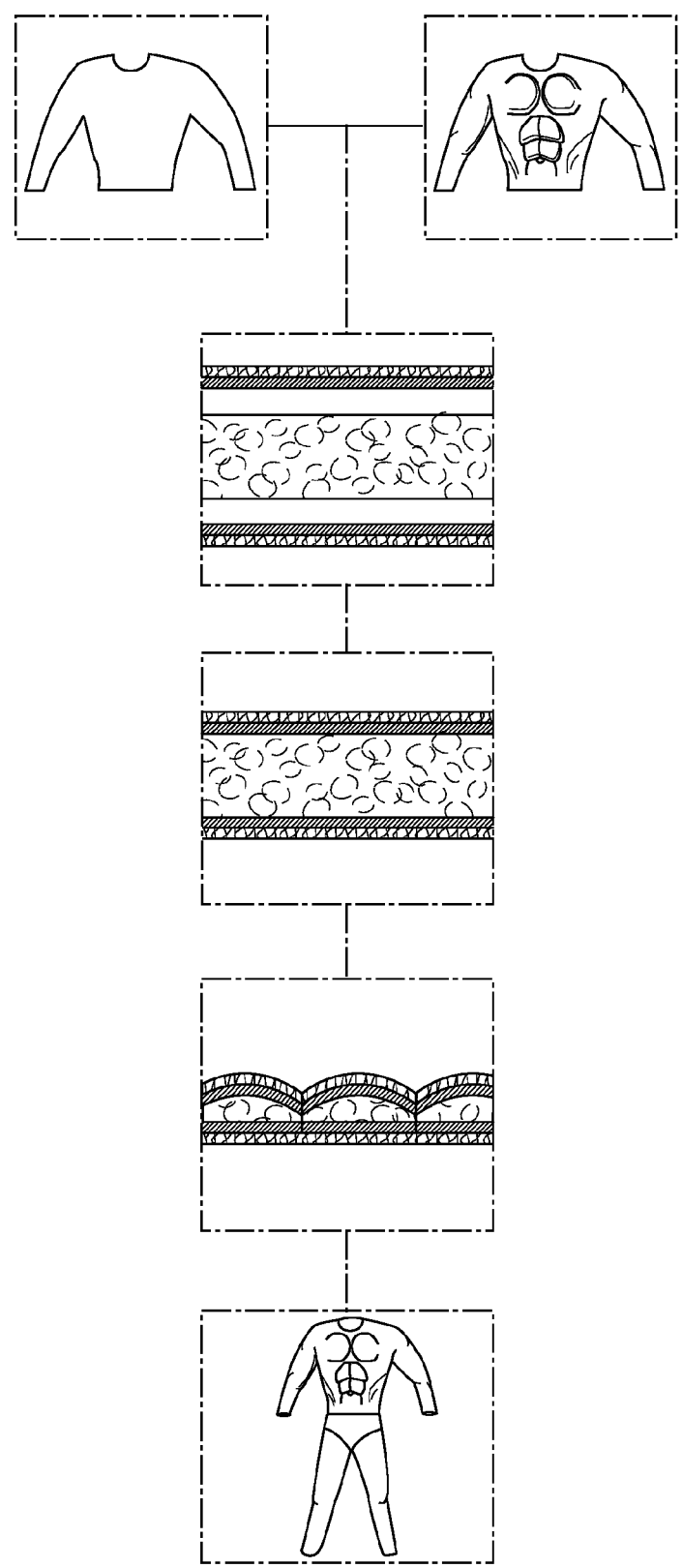
FIG. 5 is a block diagram of the steps in a manufacturing process according to the present invention as set forth.
Figure 7:
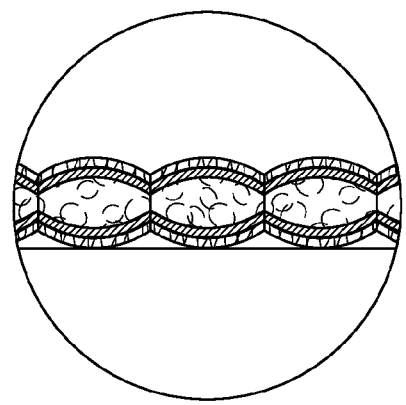
FIG. 7 is a cross sectional and enlarged view of a section of the upper torso component made according to the present invention, with the sonic lines of securing the outer fabric to the cushiony foam shown as exaggerated vertical lines (this Figure shows the increased puffiness of the contours).
Figure 7A:
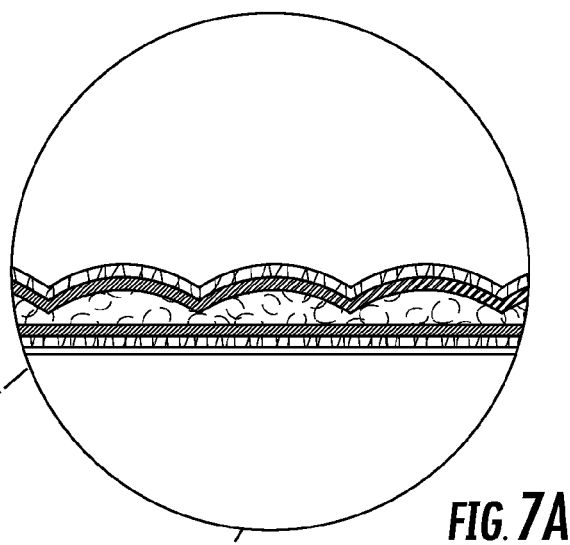
FIG. 7A is an enlarged, partial and cross sectional views of the prior art upper torso components used with the costumes shown in FIG. 6.
Figure 6:
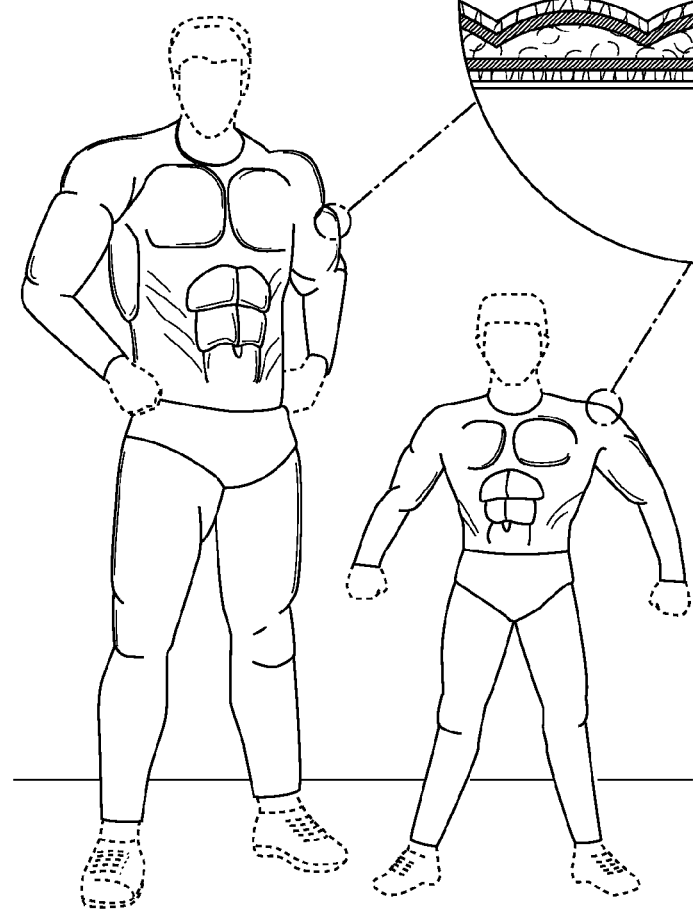
FIG. 6 shows a costume for a child or adult with an integrated 3-dimensional upper torso component made according to the prior art. It will be appreciated, however, that the invention disclosed herein will superficially appear quite similar to those shown in FIG. 6.

At the inside or foam-contact surfaces of the outside layer 14 and the inside layer 16, where the same come into contact with the foam or central filler layer 12, adhesive lines are preferably brushed or applied to the surfaces of the filler 12, where the sonic welding is to take place, between foam and fabric layers. This, when provided with suitable energy, will activate the adhesive and cause a sonic welding of the fabric layers 14 and 16 (if provided) to the foam layer 12. The outer surface of the outside fabric layer 14 preferably has graphic printing lines 18 thereon by conventional printing, stamping or by a heat transfer or screen printing. Preferably the graphic printing lines use stretchable or expandable inks. Preferably, these graphical printing lines 18 are also guide lines for defining the sonic welding and defining, too, the three dimensional areas between adjacent graphic and weld lines. As can be seen in FIGS. 3 and 4, a puffed out area 20 is comprised of a convex, outwardly, section 21 defined by so-called boundary lines 22 which correspond to the weld lines. The weld lines 22 are of small thickness, i.e., foam to layer of fabric is small in comparison to the thicker puffed out area 20. Thus, puffed out or outwardly convex areas are provided and defined by troughs or valleys (the sonic weld lines). This gives the component an obvious three dimensional configuration, especially when puffed out areas 20 are provided adjacent to one another (but separated by the sonic weld lines). The boundary lines or sonic weld lines (corresponding, preferably to the graphic lines for enhancing the image provided) are formed by segments of arcs, straight lines, semicircles, among others. This arrangement of lines 22 define the outer edges of the shapes of the three-dimensional areas 20, in the case of the illustration, the well-toned six-pack, muscles to be simulated into well-toned muscles of three dimensions and, consequently, obtaining the anatomical arrangement of the character or other forms suitable for obtaining inanimate objects in general. The boundary lines 22 not only visually define the edges of the outwardly convex three-dimensional puffed out areas 20 but also serve to provide a visual path for a sonic weld operator to follow (like a sewing machine) to use sonically or high frequency welding of the top layer of the fabric 14 through and to the foam filling 12 and to the inside layer of gauze or fabric 16 (if supplied) or from top layer 14 of fabric through and to the inner foam or filling 12. In the preferred embodiment the foam layer 12 is coated, where desired for boundary lines 22, with an adhesive which is activated to bind the foam layer 12 to the outer layer 14 (and inner layer 16 if provided) as the sonic welding is accomplished.

The process comprises the following steps, not necessarily in the sequential order set forth:

a) initial cutting, molding or modeling of foam filler 12 or cushiony material into the basic desired perimeter of the three dimensional shape ultimately desired in the end product b) cutting, molding, modeling, shaping of printing or outer fabric surface 14 and graphic printing thereon, if desired (3) and cutting, shaping modeling or molding the inner fabric or gauze lining 16, the inner and outer fabric's perimeter both being related to the perimeter and shape of the foam filler 12. Then, an adhesive brushing on the foam 12 (or the inside of the fabric layers 14 or 16) where sonic welding of fabric to foam is desired. Then, the proper aligning and overlaying or juxtaposition of components 12, 14, and 16 (if provided). Welding (preferably sonic or high frequency welding) of the two or three layers (outer fabric 14, inner foam 12 and inside fabric 16 or gauze, if used) by means of ultrasound or the higher-frequency welding to activate the adhesive such that foam 12 is adhered to the inside of the outer fabric 14 and, if used, the same foam is adhered to the inside layer of the inside fabric 16 (or gauze). The sonic or other welding generally will last about 25 seconds and with the frequency controlled and set substantially in accordance with the density and thickness of the foam filler 12.

Then, the complete component is transferred to be finished and now a three-dimensionally formed plate or component or composite of two or three total layers (fabric and foam with or without a second layer of fabric or gauze) and the component is then integrated sith other fabric components—all to form a complete costume. This can be done by sewing or other welding or integration techniques and finishing into an article of clothing and/or a costume garment. Here, the layers 14 and 16, with foam filler 12 now held against the layer(s) in a three dimensional manner, are integrated into the clothing and/or costume garment, and with, for example, a back piece, arms or sleeves, legs, "underwear" etc., through preferably conventional sewing, are formed into a complete costume.

Thus, the formed sonically welded composite (foam and fabric) includes three dimensional puffed out areas and troughs, defined by the sonic weld lines, superimposed by the graphic lines. The filler material 12 is made to appear relatively puffed out in comparison to the flatter lines of sonic welding, all from the viewer's perspective. The finished composite is sewn or joined as desired.

It is true that when the invention is put into practice, modifications may be made in relation to certain details of construction and form, without thereby departing from the fundamental principles that are clearly substantiated by the set of claims, thus it is to be understood that the terminology used was not for the purpose of limitation but mere explanation.

The invention claimed is:

1. A three dimensional upper torso component for a costume simulating the well-toned muscle development of an adult male comprising:
    an outer fabric layer having one or more visual graphic lines printed thereon as visible guide lines and demarking, aspects of the muscle separation of a well toned adult male;
    a backing layer of cushiony inside material secured to said outer fabric layer;
    wherein said backing layer of cushiony material is sonic welded directly to said fabric layer along and atop said graphic lines.

2. A three dimensional upper torso component for a costume as claimed in claim 1 wherein said outer fabric layer is polyester.

3. A three dimensional upper torso component for a costume as claimed in claim 1 wherein said layer of cushiony inside material is foam.

4. A three dimensional upper torso component for a costume as claimed in claim 1 further comprising an inside layer of fabric forming, with said outer fabric layer, a sandwich for said cushiony inside material.

5. A three dimensional upper torso component for a costume as claimed in claim 4 wherein said inside layer of fabric is gauze like material.

6. A three dimensional upper torso component for a costume as claimed in claim 1 wherein said sonic welding of said backing layer of cushiony inside material to said outer fabric layer is facilitated by an adhesive substance.

* * * * *